3,109,030
PREPARATION OF ALKYLATED DECABORANE
Elmar R. Altwicker, Dayton, Ohio, Earl A. Weilmuenster, Kenmore, N.Y., and Alfred B. Garrett, Columbus, and Samuel W. Harris, Oxford, Ohio, assignors, by mesne assignments, to Olin Mathieson Chemical Corporation, a corporation of Virginia
No Drawing. Filed Oct. 12, 1955, Ser. No. 540,141
4 Claims. (Cl. 260—606.5)

Our invention relates to a method for the preparation of liquid alkylated decaboranes, particularly alkylated decaboranes containing from 1 to 5 carbon atoms in each alkyl radical. The alkylated decaboranes prepared by the method of our invention are useful as fuels.

It is known in the art to prepare decaborane. The material is a stable, white, crystalline solid which melts at 99.5° C. and which boils at 213° C. Decaborane is a boron hydride of very high boron content and has a very high heat of combustion indicating its utility as a high energy fuel. Being a solid, however, decaborane is not conveniently handled and this detracts from its utility for fuel purposes.

In accordance with our present invention, we have discovered that decaborane and lower alkyl halides can be reacted in admixture with the alkylation catalyst ferric chloride to form liquid alkylated decaboranes. The alkyl halides used contain from 1 to 5 carbon atoms and the alkylated decaboranes produced by the reaction using ferric chloride as an alkylation catalyst contain from 1 to 4 alkyl groups attached to each decaborane nucleus. The new products produced in accordance with the method of our invention are borohydrocarbons of relatively high boron content and at the same time they are liquids, so that they constitute an easily handled fuel of considerably greater energy content than the simple hydrocarbon fuels.

The preparation and manner of using liquid alkylated decaboranes, including monomethyldecaborane and monoethyldecaborane, is described in Altwicker, Garrett, Weilmuenster and Harris application Serial No. 497,407, filed March 28, 1955 and issued as U.S. Patent No. 2,999,117 on Sept. 5, 1961.

The following examples illustrate in detail various embodiments which fall within the scope of our invention. In the examples, the term "moles" means gram moles unless otherwise specified.

EXAMPLE I

The reaction was carried out in a 1250 ml. autoclave which was constructed of type 340 stainless steel. Superimposed above the autoclave and connected to it by means of a screw connection was a water-cooled condenser 10 inches in length. A blow-out disc assembly was connected to the top of the condenser in a vertical position. Attached to a manifold, which was connected to the top of the condenser and at a right angle to it, was a Bourdon-type pressure gauge for the purpose of determining the pressure of the closed system during the reaction. Two in-line valves were attached to the end of the manifold and a T situated between the valves was equipped with a single similar valve. During the reaction all valves leading from the manifold were closed. Gaseous materials present in the reaction system at the conclusion of the reaction were removed through the manifold. The autoclave was also equipped with a magnetic stirrer for the purpose of stirring the charge during the reaction.

The decaborane used in this experiment, as well as in the other Examples except Example III, was 96.3 percent pure according to chemical analysis and was obtained by recrystallization of decaborane in methylene chloride. To the autoclave 48.8 g. (0.4 mole) of crystalline decaborane and 6.5 g. (0.04 mole) of anhydrous ferric chloride were added. The autoclave was then cooled to a temperature of approximately −60° C. by placing it in a container filled with Dry Ice. Liquid methyl chloride in the amount of 57.5 g. (1.15 moles) was added and the autoclave was sealed. Next, the autoclave was immersed in a water bath maintained at 80° C. and the magnetic stirrer started. At the conclusion of the reaction (final pressure 225 p.s.i.g.) the autoclave was cooled by immersion in water to approximately 20° C. and the gases present in the autoclave were released through a flask filled with water which served to trap out the hydrogen chloride. Unreacted methyl chloride in the gases passed through the water trap and was vented. Titration of the solution in the water trap with standard base revealed that 0.347 mole of hydrogen chloride had been produced during the reaction. The autoclave was then opened, the contents filtered and the precipitate washed with n-pentane. The dried precipitate of recovered ferric chloride weighed 2.3 g. which represented a 35 percent recovery of the ferric chloride charged. In the next step the filtrate was cooled to −55° C. and filtered to remove any precipitated decaborane. By weight 16.8 g. of decaborane was recovered which represented a 34.0 percent recovery of the decaborane charged. From infrared analysis it was estimated that the recovered decaborane was 90 percent pure. The n-pentane in the filtrate was removed under reduced pressure and the residue distilled at 48–54° C. at a pressure of 0.55 mm. of mercury. From this distillation operation 34.0 g. of clear, liquid, alkylated decaboranes was obtained overhead. By analysis, the boron content of the clear liquid was shown to be 74.7 percent while the calculated boron content for monomethyldecaborane ($CH_3B_{10}H_{13}$) is 79.4 percent. The yield in this reaction was 95.5 percent based on the assumption that the entire product was monomethyldecaborane.

The percent conversion of decaborane was 66. Based on the hydrogen chloride evolved during the reaction, the percent alkylation was 132 (100 percent alkylation would represent the conversion of all decaborane used to monoethyldecaborane).

EXAMPLE II

In this experiment, which was carried out in the apparatus as described in Example I, 0.40 mole of decaborane and 0.08 mole of anhydrous ferric chloride were added to the autoclave which was then cooled to approximately −60° C. by immersion in a bath of Dry Ice. In the next step 1.15 moles of liquid methyl chloride was added to the cold autoclave and the autoclave sealed.

After the autoclave had been immersed in a water-bath which was maintained at a temperature of 70° C., the magnetic stirrer was started. The reaction was continued for 5¾ hours and the final pressure reading was 225 p.s.i.g. At the conclusion of the reaction the autoclave was cooled and the gases present were vented through a water-filled flask. Titration of the water solution in the flask showed that 0.435 mole of hydrogen chloride had been evolved. The contents of the autoclave were filtered and the precipitate washed with n-pentane. The dried precipitate of recovered ferric chloride weighed 4.8 g. which, based on the amount of ferric chloride charged, represented a recovery of 37.0 percent. The filtrate was cooled to −55° C. and filtered to remove any precipitated decaborane. In this experiment 14.3 g. which represented a recovery of 29.3 percent of the decaborane charged, was filtered off. After removal of the n-pentane from the filtrate under reduced pressure, the residue was distilled. At 45–55° C., under a pressure of 0.50 mm. of Hg, 38.1 g. of clear liquid alkylated product was obtained overhead which represented a yield 99.3 percent based on the assumption that the entire product was monomethyldecaborane. The percent boron in the alkylated product was shown to be 72.78 and 73.43 on the basis of two analyses. The calculated boron content for monomethyldecaborane ($CH_3B_{10}H_{13}$) is 79.4 percent. The percent alkylation, as determined from the 0.435 mole of hydrogen chloride evolved, was 153 and the percent decaborane conversion was 71.

Table I sets forth pertinent data with respect to eight other experiments which were completed in the manner of Examples I and II.

EXAMPLE III

In this experiment a bomb constructed of Type 347 stainless steel and of 300 ml. capacity was utilized. During the experiment the bomb was revolved through a 30° arc by a motor-driven rocker at the rate of 26 oscillations per minute. The bomb was cradled in a jacket heated by two 500 watt resistance units. Temperature control was achieved by connecting a Foxboro potentiometer controller in the circuit with the bomb heaters. Bomb and heating jacket temperatures were measured with separate iron constantan thermocouples and the temperatures recorded automatically. The pressure was indicated on a 0–1000 pound stainless steel gauge.

After the bomb had been cleaned with methyl alcohol and acetone, it was purged with dry nitrogen and cooled in a bath of Dry Ice and acetone. To the bomb were added 0.2 mole of decaborane of over 99 percent purity which had previously been recrystallized from methylene chloride and dried, 0.1 mole of anhydrous, sublimed and purified ferric chloride and 0.4 mole of methyl chloride of 99.5 percent purity. The bomb was then closed and placed in the rocker. After the pressure gauge and vent had been connected, the cold bomb and its connections were pressure tested at 50–100° p.s.i.g. with dry nitrogen. The nitrogen was vented, the thermocouples attached and the heating and rocking started. The bomb temperature in this experiment was maintained at 110° C. during the reaction. The maximum pressure was 249 p.s.i.g. After 150 minutes the rocking and heating were stopped. The bomb was removed from the rocker, cooled in a stream of air and then in a stream of cold water until it was at room temperature. Gases from the bomb were passed through a gas absorption bottle filled with water to remove hydrogen chloride. By titration with a standard solution of sodium hydroxide to the phenolphthalein end point it was determined that 0.180 mole of hydrogen chloride had been evolved. After removal of the gases, the bomb was opened and the contents removed. Then the bomb was washed with three 20–30 ml. portions of methylene chloride. These washes were combined with the contents of the bomb which were removed initially.

In the next step the methylene chloride solution was placed in a 500 ml. round-bottom flask and water (about 200 ml.) was added to hydrolyze the ferric chloride. After the water and methylene chloride layers had been separated, by means of a separatory funnel, the methylene chloride layer was subjected to distillation and the methylene chloride was removed at 30° C. under a pressure of 1–5 mm. Hg. To the crude product was added 100 ml. of n-pentane and the mixture was cooled in a Dry-Ice-acetone slurry to about −74° C. for one hour. Decaborane, which crystallized out during the cooling operation, was removed by filtration and the filtrate distilled at 30° C. under a pressure of 1–5 mm. Hg to remove the n-pentane. A one-plate distillation of the crude product was made and over the temperature range of 65°–71° C. and at a pressure of 2 mm. Hg 15.4 g. of liquid alkylated decaboranes was recovered.

Table 2 sets forth pertinent data with respect to five other experiments which were completed in the manner of Example III.

EXAMPLE IV

In this experiment a 500 ml., three-necked flask, equipped with a water-cooled condenser, a stirrer and an addition funnel was utilized. Nitrogen was passed continuously through the reaction flask, up through the condenser and finally through a flask filled with water in order to sweep out any hydrogen halide evolved during the process.

To the 500 ml. flask were added 0.1 mole of decaborane and 0.03 mole of anhydrous ferric chloride. Nitrogen flow was started through the apparatus. Then there was added, with stirring, 0.4 mole of ethyl bromide. After 3 hours an additional quantity of ferric chloride in the amount of 0.02 mole was added to the reaction system. The temperature of the reaction was maintained at 37° C. during the entire reaction period by heating.

At the end of the 6 hour reaction period the reaction was stopped by the addition of 200 mls. of water to the reaction flask. Two layers formed, the top containing the alkylated decaboranes and the bottom containing ferric chloride and water. By means of a separatory funnel the bottom layer was drawn off and discarded. The crude alkylated product was cooled to −50° C. by immersion in a bath maintained at −78° C. In the next step the product was filtered through a Buchner funnel to remove precipitated decaborane and in this manner 6.6 g. of decaborane was obtained. The crude product was distilled under vacuum and 5.6 g. of liquid alkylated product was obtained over a temperature range 75°–90° C. at a pressure of 1 mm. Hg.

During the reaction 0.068 mole of hydrogen bromide was evolved which represented a degree of alkylation of 147 percent. By analysis, the product was shown to contain 58.8, 58.6 percent boron while the theoretical percent boron in monomethyldecaborane ($CH_3B_{10}H_{13}$) is 71.96. The percent conversion of decaborane was 46.

EXAMPLE V

In this experiment 0.1 mole of decaborane and 0.05 mole of anhydrous ferric chloride were added to a 300 ml. stainless steel rocking autoclave. The autoclave was cooled with Dry-Ice and 0.4 mole of ethyl chloride was added to the reactor. During the reaction, which was carried out over a period of 3¼ hours, the temperature of the reaction was maintained at 60° C. The final pressure of the reactor was 45 p.s.i.g. At the conclusion of the reaction the autoclave was cooled and the gases were released through a flask filled with water in order to trap out the hydrogen chloride formed. Titration of the solution with a standard base revealed that 0.021 mole of hydrogen chloride had been evolved, which corresponds to a percent alkylation of 80.

The contents of the autoclave were filtered and the precipitate washed with n-pentane. The filtrate was cooled to −40° C. and filtered again to remove any precipitated decaborane. In this experiment 9.0 g. of decaborane corresponding to a recovery of 74.0 percent of decaborane charged was obtained in this filtration. By infrared analysis this decaborane was estimated to be 90 percent pure. The n-pentane in the filtrate was removed under reduced pressure and the residue distilled at 65°–75° C. (0.7 mm. Hg). From this distillation 3.4 g. of clear liquid product was obtained which represents a yield of 87 percent based on monoethyldecaborane being the only product. By analysis the product was found to contain 71.9, 72.2 percent boron. (The theoretical boron content of monoethyl-decaborane ($CH_3B_{10}H_{13}$) is 71.96.) The percent conversion of decaborane was 26.

EXAMPLE VI

In this experiment the stainless steel autoclave, 1250 ml. capacity as described in Example I, was utilized. To the autoclave were added 0.4 mole of decaborane and 0.2 mole of anhydrous ferric chloride. After cooling the autoclave to a temperature of −60° C. by immersion in a Dry-Ice bath, 1.6 mole of ethyl chloride was added, the reactor sealed by attaching the condenser assembly and the autoclave immersed in a water-bath maintained at 70° C. The reaction was allowed to proceed, under pressure, for 1.1 hours. The final pressure of the reaction system was 150 p.s.i.g.

After cooling, the gases present in the autoclave were released through a flask filled with water in order to trap out the hydrogen chloride formed. Titration of the solution with a standard base revealed that 0.398 mole of hydrogen chloride had been evolved. This amount of hydrogen chloride corresponds to percent alkylation of 135 based on the fact that 100 percent represents an all-monoalkylated product. The contents of the autoclave were filtered to remove ferric chloride and the precipitate washed with n-pentane. Then the filtrate was cooled to −50° C. and filtered to remove any precipitated decaboane. In this case the precipitate weighted 11.5 g. which corresponds to a recovery of 23.4 percent of decaborane charged. By infrared analysis the decaborane removed was shown to be 90 percent pure. n-Pentane in the filtrate was removed at a reduced pressure and the residue distilled at 82°–110° C. (1.3 mm. of Hg). From the distillation there was obtained 40.0 g. of clear liquid alkylated decaboranes which corresponds to a yield of 87 percent based on the assumption that the product was all monoethyldecaborane. The conversion of decaborane in this experiment was 77 percent. By analysis, the product was shown to contain 68.8, 68.3 percent boron. (Theoretical percent B for monoethyldecaborane ($C_2H_5B_{10}H_{13}$) is 71.96.)

Table 3 sets forth pertinent data with respect to eight other experiments which were conducted in the same manner of Example VI.

EXAMPLE VII

This experiment was conducted in a stainless steel autoclave of 840 ml. capacity which was equipped with a pressure gauge, rupture disc, magnetic stirrer and a heating bath.

To the autoclave were added 0.5 mole of decaborane which had previously been recrystallized from methylene chloride, 0.6 mole of ethyl chloride, and 0.05 mole of anhydrous ferric chloride. The vessel was then closed and placed in a heating bath at 75° C. The pressure gradually rose to 178 p.s.i.g. during the 80 minute period. After the autoclave had been cooled, the hydrogen chloride formed was vented from the autoclave through a water trap. Titration of this water solution revealed that 0.39 mole of hydrogen chloride had been evolved.

The autoclave was opened and the contents discharged into a flask. In order to remove completely the crude product from the autoclave it was washed with 20 mls. of methylene chloride; the washings were added to the flask. In the next step the methylene chloride was removed from the reaction mixture by distillation. This distillation process, which was commenced at atmospheric pressure, was continued at reduced pressure until the temperature reached 25° C. at 5 mm. Hg. One hundred fifty grams of n-pentane was added to the crude product and the resulting mixture cooled to −70° C. by immersion of the flask in a Dry-Ice-acetone bath. The slurry was filtered to remove decaborane which had crystallized out during the cooling process. In this manner 32 g. of decaborane was recovered.

To remove the n-pentane the crude product was distilled, first at atmospheric pressure, and then under reduced pressure. This first distillation step was continued until the temperature reached 35° C. at 1 mm. of Hg. Heating was continued and over the temperature range of 65°–75° C. at 1 mm. of Hg, the liquid alkylated decaborane product came over. At the conclusion of this distillation operation a residue of 1 g. remained in the flask.

By analysis the product contained 67.8 percent boron. The percent alkylation was 160. By infrared and mass spectrographic analyses the product was shown to consist of mono- and diethyldecaboranes with the monoalkylated product being present to the extent of about 80 percent. The conversion of decaborane was 48 percent.

Various modifications can be made in the procedures of the specific examples to provide other embodiments which fall within the scope of our invention. Thus, in place of the methyl chloride, ethyl bromide and ethyl chloride utilized in the specific examples, there can be substituted an equimolar amount of an alkyl monohalide having from 1 to 5 carbon atoms, for example, methyl bromide, methyl iodide, ethyl fluoride, ethyl iodide, n-propyl fluoride, n-propyl bromide, n-propyl chloride, n-propyl iodide, isopropyl chloride, isopropyl bromide, isobutyl fluoride, isobutyl chloride, isobutyl bromide, isobutyl iodide, secondary butyl chloride, n-amyl chloride, n-amyl bromide, and so forth. The molar proportion of decaborane and alkyl monohalide present in the reaction mixture can be varied considerably without departing from the invention, larger ratios of alkyl monohalide resulting in the production of a higher proportion of dialkylated and trialkylated products. In general, however, the molar ratio of alkyl monohalide to decaborane employed in carrying out the reaction would be within a range of 1:1 to 6:1. To limit polyalkylation it may be advantageous in commercial production of alkylated decaboranes to carry out the reaction in the presence of a large excess of decaborane. The quantity of ferric chloride catalyst utilized can likewise be varied widely from about 0.03 mole of ferric chloride to 1 mole of decaborane to about 1 mole of ferric chloride to 1 mole of decaborane. However, the preferred range of catalyst concentration is from 0.05 mole of ferric chloride to 1 mole of decaborane to about 0.5 mole ferric chloride to 1 mole of decaborane.

The temperature of the reaction can be varied widely from about 50° C. to 200° C. However, the preferred range is from 60° to 150° C. Pressures of from about 0 to 500 p.s.i.g. depending upon the reaction system employed can be utilized in order to attain the temperatures necessary for high reaction rates. The reaction can be operated in a closed system or the gases evolved during the reaction can be vented in such a manner as to maintain a desired pressure throughout the reaction period. Reaction time can be varied from about 0.1 hour to 10 hours. However, the preferred range is from 1 hour to 8 hours. Depending upon the temperature and the alkyl halide, quantity of catalyst employed, reaction time can be varied widely.

Table 1

| Expt. No. | $B_{10}H_{14}$ (moles) | $CH_3Cl$ (moles) | $FeCl_3$ (moles) | Final Press. (p.s.i.g.) | Temp., °C | Time, hrs. | Wt. of Prod. (g.) | Percent $B_{10}H_{14}$ Conversion | Percent Yield [a] | Percent Boron [b] | HCl Evolved (moles) | Percent Alkylation | Filrate Cooled (°C.) |
|---|---|---|---|---|---|---|---|---|---|---|---|---|---|
| A | 0.4 | 1.3 | 0.04 | 243 | 80 | 3½ | 48.1 | 72 | 102 | 72.6 / 73.0 | 0.492 | 165 | −57 |
| B | 0.4 | 1.3 | 0.08 | 243 | 80 | 3½ | 41.7 | 80 | 96 | 75.86 / 75.48 | 0.455 | 142 | −58 |
| C | 0.4 | 2.213 | 0.08 | 355 | 80 | 5½ | 48.2 | 89 | 100 | 71.98 / 72.02 | 60.760 | 214 | −29 |
| D | 0.4 | 2.213 | 0.08 | 310 | 80 | 4 | 40.5 | 75 | 100 | 74.19 / 73.79 | 0.525 | 175 | −70 |
| E | 0.4 | 2.213 | 0.08 | 285 | 80 | 1¾ | 28.0 | 56 | 92 | 77.7 / 77.2 | 0.273 | 122 | −70 |
| F | 0.4 | 0.4 | 0.08 | 137 | 80 | 4½ | 29.0 | 59 | 90 | 76.0 / 76.7 | 0.295 | 125 | −68 |
| G | 0.4 | 0.4 | [c] 0.08 | 155 | 80 | 4½ | 35.9 | 65 | 101 | 76.0 / 75.5 | 0.345 | 132 | −72 |
| H | [d] 0.4 | 0.4 | 0.08 | 135 | 80 | 4½ | 30.4 | 53 | 106 | 75.2 / 75.8 | 0.253 | 120 | −68 |

[a] Yield based on assumption entire product is monomethyldecaborane.
[b] Calcd. for $CH_3B_{10}H_{13}$: B, 79.36. Calcd. for $(CH_3)_2B_{10}H_{12}$: B, 71.94.
[c] FeCl₃ recovered from Experiments E and F used here.
[d] Recovered $B_{10}H_{14}$ used here. Chemical analysis indicated 90 percent decaborane.

Table 2

| Expt. No. | Mole $B_{10}H_{14}$ | Mole $CH_3Cl$ | Mole $FeCl_3$ | Bomb Conditions | | | Wt. of Prod. (g.) | Mole HCl from Bomb | Percent Conv. | Percent Alkylation | Percent Boron |
|---|---|---|---|---|---|---|---|---|---|---|---|
| | | | | Temp., °C | Run Time, Min. | Max. Press. p.s.i.g. | | | | | |
| A | 0.2 | 0.4 | 0.1 | 101 | 240 | 178 | 15.4 | .146 | 61.1 | 120 | 75.5 |
| B | 0.2 | 0.8 | 0.05 | 110 | 240 | 510 | 20.0 | .396 | 93.4 | 214 | 67.7 |
| C | 0.2 | 0.8 | 0.05 | 101 | 270 | 453 | 21.0 | .369 | 87.0 | 213 | 70.5 |
| D | 0.2 | 0.4 | 0.05 | 101 | 240 | 198 | 15.0 | .155 | 67.5 | 115 | 72.5 |
| E | 0.2 | 0.4 | 0.05 | 110 | 200 | 220 | 13.6 | .156 | 70.1 | 111 | 72.5 |
| F | 0.2 | 0.2 | 0.1 | 99 | 155 | 108 | 8.9 | 0.053 | 53.3 | 50 | 75.81 |
| G | 0.2 | 0.6 | 0.1 | 102 | 195 | 295 | 18.0 | 0.241 | 70.5 | 171 | 72.50 |
| H | 0.2 | 0.8 | 0.1 | 101 | 260 | 335 | 20.2 | 0.291 | 78.7 | 189 | 72.28 |
| J | 0.2 | 1.0 | 0.1 | 99 | 345 | 558 | 19.5 | 0.434 | 93.0 | 233 | 68.81 |

Table 3

| Expt. No. | $B_{10}H_{14}$ (moles) | $C_2HC_5$ (moles) | $FeCl_3$ (moles) | Final Press. (p.s.i.g.) | Temp., °/C. | Time, Hrs. | Wt. of prod. (g.) | Percent $B_{10}H_{14}$ Conv. | Percent Yield | Percent Baron | HCl Evolved (moles) | Percent Alkylation | Filtrate Cooled, °/C |
|---|---|---|---|---|---|---|---|---|---|---|---|---|---|
| A | 0.1 | 0.4 | 0.05 | 45 | 60 | 3¼ | 3.4 | 26 | 87 | 71.9 / 72.2 | 0.021 | 80 | |
| B | 0.4 | 1.6 | 0.2 | 118 | 70 | 1⅙ | 32.6 | 64 | 82 | 70.9 / 70.9 | | | −70 |
| C | 0.4 | 1.6 | 0.2 | 107 | 70 | 1⅙ | 16.5 | 65 | 88 | 69.6 / 69.8 | | | −70 |
| D | 0.4 | 1.6 | 0.2 | 205 | 70 | 2 | 47.4 | 93 | 85 | 62.5 / 62.6 | 0.676 | 182 | −68 |
| E | 0.4 | 1.6 | 0.04 | 150 | 70 | 1⅚ | 40.0 | 71 | 95 | 66.9 / 67.1 | 0.383 | 135 | −70 |
| F | 0.4 | 1.6 | 0.02 | 130 | 70/80 | 3½ | 24.2 | 41 | 100 | 70.0 / 69.9 | 0.202 | 122 | −70 |
| G | 0.4 | 0.4 | 0.4 | 132 | 70 | 2 | 44.5 | 72 | 100 | 65.10 / 65.43 / 63.94 / 64.93 | 0.356 | 124 | −67 |
| H | 0.4 | 0.4 | 0.04 | 119 | 60 | 8 | 42.2 | 69 | 100 | 64.42 / 65.13 / 64.30 / 64.44 | 0.343 | 124 | −74 |

We claim:

1. A method for the preparation of an alkylated decaborane which comprises reacting decaborane and an alkyl monohalide having from 1 to 5 carbon atoms while the reactants are in admixture with a catalytic amount of ferric chloride.

2. The method of claim 1 wherein the alkyl monohalide is methyl chloride.

3. The method of claim 1 wherein the alkyl monohalide is ethyl chloride.

4. The method of claim 1 wherein the alkyl monohalide is ethyl bromide.

References Cited in the file of this patent

Groggins: Unit Processes In Organic Synthesis, 4-edition (1952), (pages 800 and 846–854 relied on).